Feb. 2, 1932. M. C. SPENCER 1,843,250
REGULATING SYSTEM FOR ALTERNATING CURRENT GENERATORS
Filed Nov. 5, 1929

Inventor,
Millard Cole Spencer,
By *Samuel W. Balch*
  Attorney.

Patented Feb. 2, 1932

1,843,250

UNITED STATES PATENT OFFICE

MILLARD COLE SPENCER, OF EAST ORANGE, NEW JERSEY, ASSIGNOR TO CROCKER-WHEELER ELECTRIC MANUFACTURING COMPANY, OF AMPERE, NEW JERSEY, A CORPORATION OF NEW JERSEY

REGULATING SYSTEM FOR ALTERNATING CURRENT GENERATORS

Application filed November 5, 1929. Serial No. 404,919.

In the provision on aircraft of electrical generators for power supply to radio sets and other purposes it is of prime importance that the weight be kept at a minimum. A generator of alternating-current type, since it does not require a winding of fine wire on its rotor which is liable to be broken by centrifugal force, can be driven at a high rate of speed and the required current generated and delivered from a machine of minimum weight. Furthermore, by driving the generator through belt or gear transmission from the airplane engine, current is generated more efficiently and there is not the drag on the airplane, as is the case with windvane driven generators. There is, however, a difficulty to be overcome, in that the engine speed may vary through a wide range while it is necessary to maintain the current which is delivered at a voltage within narrow limits, and the object of this invention is to provide a regulation system by which current at substantially constant voltage will be automatically delivered from an alternating-current generator which is of minimum weight and which is driven at variable speed.

In the accompanying sheet of drawings which forms a part of this description,

The regulating system is illustrated in conjunction with an alternating-current generator or alternator having a toothed rotor 5 without windings, and in the stator main direct-current field coils 6, 6 and differential direct-current field coils 7, 7 so wound and supplied that they oppose the main field coils and cause the fields of the generator to be differentially excited. Alternating current is generated in coils 8, 8. This type of alternator with all sets of coils on the stator, however, is not essential to the system of regulation, but all of the coils are preferably located in the stator portion of the alternator in order that it may be driven at high speed without danger to windings through centrifugal action.

Figure 1:
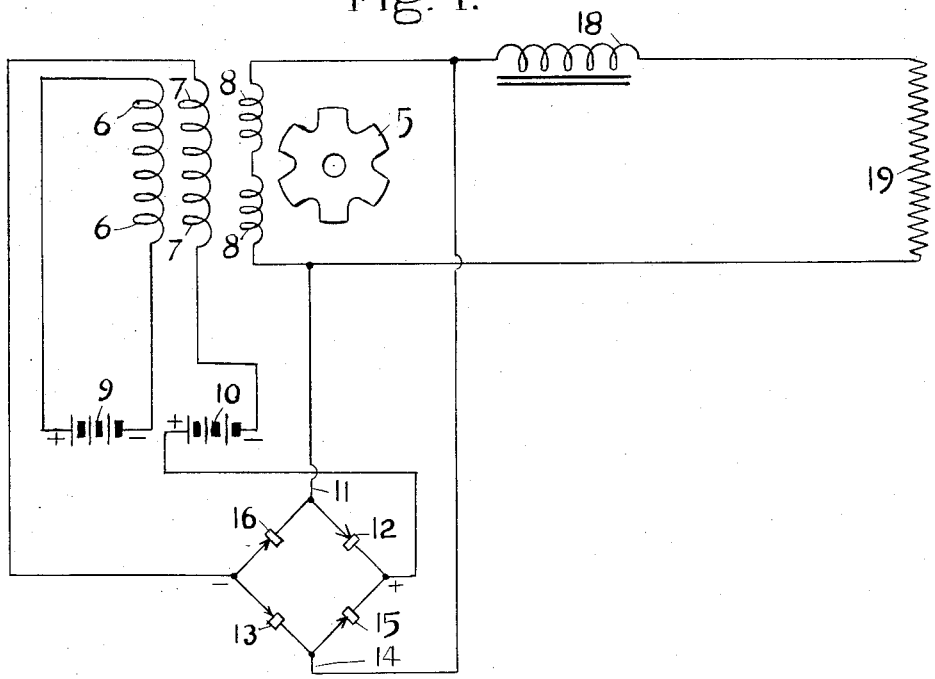
Figure 1 is a diagram including a generator and the regulating apparatus therefor in accordance with this invention in which two independent sources of constant potential are provided, one for field excitation and the other in the regulation system.

Referring particularly to Fig. 1, the main direct-current field coils are energized from a constant potential source of direct current, as the battery 9. This provides a magnetic field of constant intensity, and, if no opposing field with means of regulation were provided on the alternator, the voltage of the current generated would be directly proportional to the speed at which the alternator is driven. It is desirable that the voltage should rise with the speed of the alternator up to the point where the normal voltage at full load is generated. With further rise in speed it is desired that the voltage of the current delivered should remain constant. In order to accomplish this object the differential field is provided at speeds above the minimum speed at which the alternator gives the required voltage. The differential direct-current field coils are energized from alternating current delivered from the generator through a group of rectifiers and an opposing battery 10 when the generator voltage rises above the opposing battery voltage. For example, at the instant when the current is positive on lead 11 its course will be through a rectifier 12, the opposing battery, the differential field coils in a contrary direction to the current in the main field coils, and a rectifier 13 to the other lead 14 of the alternator. At the instant when the current is positive on lead 14 its course will be through a rectifier 15, the opposing battery, the differential field coils in the same direction as before, and a rectifier 16 to the lead 11 of the alternator.

When the alternator is starting and is not generating current at sufficient voltage to overcome the opposing battery no current passes through this field from the opposing battery since it is prevented by the rectifiers and the differential field coils receive no current in either direction. When the alternator speed rises sufficiently to generate normal voltage and above, current from both the positive and the negative pulses of the alternator commences to pass through the differential field coils so as to oppose the main field, and the amount so passed will vary with the amount that the rectifier voltage exceeds the battery voltage. This differential action will tend to weaken the field of the alternator and cut down the voltage generated, but, since this regulation is derived from the variation of the voltage in the alternator, the voltage can not thereby be maintained entirely constant at the alternator terminals with variations in the speed at which the alternator is driven.

In order to further improve the regulation and assure a sufficiently uniform voltage, a reactor 18 is inserted in one of the leads to the load 19 which is to be supplied with current at substantially constant potential. The action of the reactor in improving the regulation is as follows. As the speed of the alternator increases, the frequency of the generated current increases in the same ratio. With constant current flowing through the load circuit the voltage drop across the reactor will be substantially proportional to the frequency.

By supplying the differential field through the rectifiers from the alternator through connections between the reactor and the alternator, it is evident that the voltage applied to the rectifiers will increase as the speed and frequency increases even without any increase in the current flowing through the load circuit. This action enables the rectifiers to deliver an increased current to the differential field and weaken the resultant alternator field to compensate for the increase in speed without any increase in the load circuit. By properly proportioning the various parts of the circuit it is thus possible to hold constant currents in the load circuit over a wide range in speed of the alternator.

Since differential action does not commence until the rectified voltage exceeds the voltage of the battery in series and opposed thereto, the regulation system does not interfere with the building up of the field in starting.

It is not essential that separate batteries be used for the supply to the main direct-current field coils and for opposing the rectifier supply to the differential direct-current field coils. They are so shown in Fig. 1 for convenience in explaining the system.

Figure 2:
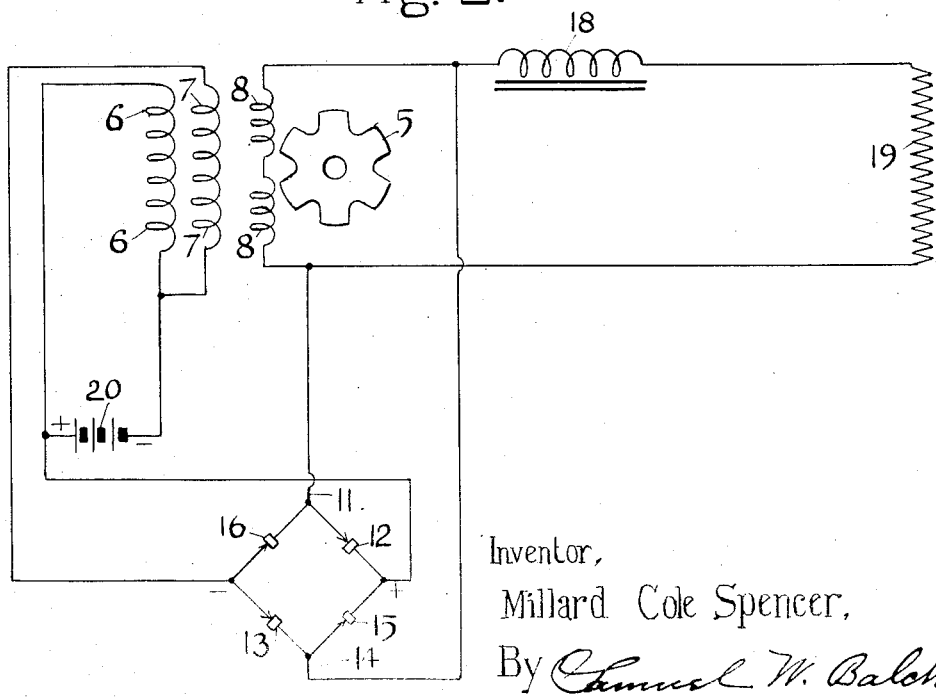
Fig. 2 is a similar diagram of a modified form in which one source of constant potential serves for both purposes.

In practice, as shown in Fig. 2 one battery 20 serves both purposes.

I claim,

1. In a regulating system, an alternating-current generator having main direct-current field coils, differential direct-current field coils, and alternating-current coils, a constant-potential source of direct current for the main direct-current field coils, a rectifier, and connections from the alternating-current coils through the rectifier and the constant-potential source of direct current in an opposed direction to the constant-potential source of direct current to the differential direct-current field coils to weaken the field excitation from the main direct-current field coils.

2. In a regulating system, an alternating-current generator having main direct-current field coils, differential direct-current field coils, and alternating-current coils, means for supplying direct current to the main direct-current field coils, a rectifier, connections from the alternating-current coils through the rectifier to the differential direct-current field coils to weaken the field excitation from the main direct-current field coils, and a reactor in the circuit to the load supplied from the generator.

3. In a regulating system, an alternating-current generator having main direct-current field coils, differential direct-current field coils, and alternating-current coils, a constant-potential source of direct current for the main direct-current field coils, a rectifier, connections from the alternating-current coils through the rectifier and the constant-potential source of direct current in an opposed direction to the constant-potential source of direct current to the differential direct-current field coils to weaken the field excitation from the main direct-current field coils, and a reactor in the circuit to the load supplied from the generator.

MILLARD COLE SPENCER.